United States Patent [19]

Mansmann

[11] 4,104,045

[45] Aug. 1, 1978

[54] THERMALLY STABLE QUARTZ GLASS

[75] Inventor: Manfred Mansmann, Krefeld, Germany

[73] Assignee: Bayer Aktiengesellschaft, Leverkusen, Germany

[21] Appl. No.: 702,835

[22] Filed: Jul. 6, 1976

[30] Foreign Application Priority Data

Jul. 10, 1975 [DE] Fed. Rep. of Germany ....... 2530808

[51] Int. Cl.² ..................... C03B 37/00; C03B 32/00; C04B 35/64
[52] U.S. Cl. ............................. 65/2; 65/33; 65/DIG. 14; 264/63
[58] Field of Search ..................... 65/DIG. 14, 2, 33; 264/63

[56] References Cited

U.S. PATENT DOCUMENTS

| | | | |
|---|---|---|---|
| 2,886,404 | 5/1959 | Teja | 65/2 |
| 3,270,109 | 8/1966 | Kelsey | 65/DIG. 14 |
| 3,287,095 | 11/1966 | Procter et al. | 65/2 |
| 3,332,490 | 7/1967 | Burtch et al. | 65/DIG. 14 |
| 3,678,144 | 7/1972 | Shoup | 264/63 X |
| 3,846,527 | 11/1974 | Winter et al. | 264/63 |
| 3,867,156 | 2/1975 | Ryujl | 65/DIG. 14 |
| 3,907,954 | 9/1975 | Mansmann et al. | 264/63 |
| 3,948,629 | 4/1976 | Bartholomew | 65/DIG. 14 |
| 3,988,405 | 10/1976 | Smith et al. | 264/63 |
| 4,010,233 | 3/1977 | Winter et al. | 264/63 |
| 4,056,588 | 11/1977 | Baniel et al. | 264/63 |

OTHER PUBLICATIONS

Handbook of Glass Manufacture vol. II, Fay Tooley pp. 192 to 199, copyright 1960.

*Primary Examiner*—S. Leon Bashore
*Assistant Examiner*—Frank W. Miga
*Attorney, Agent, or Firm*—Burgess, Dinklage & Sprung

[57] ABSTRACT

Quartz glass of high thermal stability is produced from a $SiO_2$ solution or sol which is substantially free of alkali and alkaline earth metal oxides and contains chromium and/or manganese in about 0.05 to 20% by weight of the $SiO_2$ expressed as $Cr_2O_3$ and $Mn_2O_3$. The quartz glass upon heating above 1100° C forms cristobalite having an average crystallite size of about 100 to 500 Å. Articles therefrom retain their physical and mechanical properties at high temperatures. The materials are suited for producing fibers by the usual methods of spinning from solutions or sols and, as such, or as fibers they are suited for use in reinforcement and insulation and in making flameproof textiles.

6 Claims, No Drawings

THERMALLY STABLE QUARTZ GLASS

This invention relates to a quartz glass or very finely crystalline cristobalite with high thermal stability of its mechanical properties which is obtained from a $SiO_2$ which is substantially free from alkali metals and alkaline earth metals and contains oxides of chromium and/or manganese in form of a solid solution. It has been found that the quartz glass with the composition according to the invention crystallizes at relatively low temperatures up to a final, definite crystallite size to form cristobalite, and that in the absence of alkali metal oxides and alkaline earth metal oxides the dissolved chromium and/or manganese oxides prevent further crystallite growth so that, at elevated temperatures, the mechanical properties are not impaired either by decreases in viscosity or by uncontrolled crystallite growth.

The use of quartz glass in accordance with the prior art as a highly heat-resistant material at temperatures above 1000° C is considerably restricted on the one hand by the softening of the glass attributable to loss of viscosity and, on the other hand, by uncontrolled irreversible recrystallization in the event of prolonged heating or thermal-shock stressing. Recrystallization in particular results in deterioration of the elastic properties through embrittlement of the material. In special applications, changes in other physical parameters, for example, the coefficient of thermal expansion, refractive index, etc., have an adverse effect. In cases where the material is used in particular for $SiO_2$ fibers, sintering rapidly occurs through loss of viscosity at temperatures above 1100° C, thereby rendering the fibers completely useless. The provision of materials which are resistant to high temperatures, especially for the production of fibers, has long been a problem in the art.

Examination of $SiO_2$-fibers produced from the quartz glass or cristobalite according to the invention reveals its surprising properties with particular prominence, so that the following description essentially relates to, but is by no means limited to, the production and properties of $SiO_2$-fibers with the composition according to the invention.

By virtue of their chemical and thermal stability, coupled with their mechanical properties, silicon dioxide fibers have been adopted for commercial application, for example as insulating fibers or reinforcing fibers. U.S. Pat. No. 3,821,070 and British Pat. No. 1,359,576 describe processes for the production of $SiO_2$-fibers which may be divided into three groups:
(a) spinning an $SiO_2$ melt;
(b) leaching silicate glass fibers with acids, and
(c) spinning a silicon-containing solution, followed by sintering.

After their production, the $SiO_2$-fibers consist of amorphous silica or quartz glass and are not in crystalline form. At relatively high temperatures, the fibers are destroyed by two different causes: firstly, the formation of cristobalite leads to the known phenomenon of "devitrification" which is characterized by a drastic reduction in strength; on the other hand quartz glass, like any glass shows a marked decrease in viscosity with increasing temperature, with the result that, in the event of prolonged exposure to heat, the fibers sinter together and lose their favorable properties. The result of these phenomena is that $SiO_2$-fibers have a maximum permissible service temperature of only 1000° C.

In the meantime, various attempts have been made to increase the service temperature. British Pat. No. 1,041,996 describes a process in which silica filaments (produced by leaching glass fibers with acid) are impregnated with an organic chromium salt solution and are subsequently subjected to heating. In this way, a deposit of chromium oxide is formed on the surface of the leached fibers, whereby the service temperature is increased for 20 minutes to 1427° C. The reason for the improved temperature resistance is said to be the $Cr_2O_3$-layer which protects the $SiO_2$-fibers against rapid devitrification.

On account of their high porosity, these fibers show only limited mechanical strength values. Fibers of this type are commercially available under the name "Irish Refrasil". French Pat. Nos. 88,564, 1,317,922 and 1,452,796 describe a similar process, the only difference being that metal oxides are actually added to the glass fibers before their production from the silicate glass melt, and leaching is carried out in such a way that the resulting $SiO_2$-fibers still contain the metal oxides. Although temperature resistance is increased in this way, the fibers produced again show only limited mechanical strength. The following metal oxides develop the activity in question: $Al_2O_3$, $Bi_2O_3$, $CoO$, $Cr_2O_3$, $MgO$, $Mn_2O_3$, $NiO$, $PbO$, $CdO$, $CuO$, $UO_2$, $WO_3$, $ZnO$, $MoO_3$, $Nb_2O_5$, $SnO_2$, $Ta_2O_5$, $ThO_2$, $V_2O_5$, $ZrO_2$. The disadvantage of leaching silicate glass fibers, apart from the poor mechanical strength of the resulting fibers, is that a leaching process is required for removing the alkali metal and alkaline earth metal ions to the greatest possible extent, because they promote "devitrification", i.e. destruction through the uncontrolled formation of cristobalite crystals. In practice, however, it is not possible to remove the alkali metal and alkaline earth metal ions to such an extent that their adverse effect is completely eliminated.

Thus, the fibers according to the aforementioned French Pat. No. 1,317,922 still contain at least 0.03% of alkali after leaching. In cases where the afore mentioned metal ions are incorporated into the glass melt, leaching is additionally complicated by the solubility of these metal ions, so that it is difficult to obtain fibers with a definite content of these metals.

The present invention provides homogeneous quartz glass of high thermal stability with a controlled tendency towards cristobalite formation up to a final, definite average crystallite size of about 100 to 500 Å, which is stable up to temperatures of about 1400° C with a modifying content of chromium and/or manganese of about 0.05 to 20% by weight, expressed as $Cr_2O_3$ and/or $Mn_2O_3$ and based on $SiO_2$, and at the very most mere traces of alkali metal and alkaline earth metal oxides, such as are inevitable in industrial processes. The invention also relates to very finely crystalline cristobalite, obtained by heating the quartz glass to temperatures above about 1100° C, with crystallite sizes as determined by X-ray photography in the range of about 100 to 500 Å.

The quartz glass or the cristobalite according to the invention is eminently suitable for use as quartz fibers or cristobalite fibers with improved mechanical properties resistant to high temperatures for the production of flameproof textile articles, for reinforcing and for insulating purposes.

Finally, the invention also relates to a process for the production of the fibers or of flakes from solutions.

Whereas, in the past, attempts have been made to displace cristobalite formation (devitrification) towards higher temperatures in order, in this way, to reduce the strength loss at high temperatures, our own tests have surprisingly shown that it is significantly more favorable, for obtaining a considerable improvement in the high-temperature properties, to form cristobalite with a small crystallite size at low temperatures than, for example, to displace cristobalite formation towards higher temperatures by a coating of $Cr_2O_3$. Surprisingly, it is possible with particular ease, by uniformly distributing chromium ions throughout the $SiO_2$ filament, to form cristobalite with a small particle diameter of a few hundred Å at low temperatures. This is all the more surprising insofar as it is precisely chromium oxide on the surface of $SiO_2$ fibers which displaces devitrification towards higher temperatures.

An effect similar to that of chromium ions uniformly distributed in $SiO_2$ is also shown by manganese ions. The other metal oxides mentioned in French Pat. Nos. 88,564, 1,317,922 and 1,452,796 are far less effective, if at all, in the formation of cristobalite at relatively low temperatures and, hence, produce no improvement in, or even adversely affect, thermal stability.

By virtue of the particularly favorable effect of chromium the production and properties are further described with reference to the chromium-containing $SiO_2$-fibers. The following description applies similarly to manganese-containing fibers although manganese shows a less favorable effect.

$Cr_2O_3$ contents of about 0.05% to 20% in the $SiO_2$-fibers have proved to be effective for improving thermal stability, although it is preferred to use about 0.1 to 10% of $Cr_2O_3$. $Cr_2O_3$ contents of about 0.1 to 2% are particularly preferred, because they are entirely adequate so far as thermal stabilization is concerned. Accordingly it is possible merely by heating for 1 hour at 1100° C to form cristobalite with a particle diameter of from about 100 to 300 Å, whereas under these conditions and even at 1200° C alkali-free $SiO_2$-fibers without an addition of $Cr_2O_3$ are still X-ray amorphous. On the other hand, $SiO_2$-fibers containing small quantities of alkali, for example $SiO_2$-fibers which have been produced from an alkali-stabilized $SiO_2$-sol and which contain 0.67% of $Na_2O$, undergo rapid devitrification at as low as 1000° C, the cristobalite crystals having a particle size of as large as 500 Å, and continuing to grow at higher temperatures with loss of strength. In contrast to alkali-containing $SiO_2$-fibers which lose their strength through the uncontrolled growth of the cristobalite crystallites, the alkali-free $SiO_2$-fibers without an addition of $Cr_2O_3$ have sintered solid and shrunk after heating for only 1 hour at 1200° C, so that they can no longer be used.

Whereas alkali-containing $SiO_2$-fibers cannot be significantly improved by an addition of chromium, chromium-containing alkali-free $SiO_2$-fibers do not undergo any sintering or any loss of strength and flexibility after heating for 24 hours at 1300° C. The cristobalite has a crystallite size of about 200 to 300 Å. By contrast, corresponding chromium-free fibers are completely sintered under these conditions. Although thereafter they also consist of cristobalite, the cristobalite in this case has crystallite sizes above 600 Å which are not attained in the case of chromium-containing $SiO_2$ fibers, even at 1500° C. The thermal stability of the chromium-containing fibers is thus increased to beyond 1500° C and higher.

The cristobalite-containing quartz glass or the cristobalite may be produced by the processes normally used for manufacturing quartz glass by adding $Cr_2O_3$ or $Mn_2O_3$ in the claimed quantity to the quartz melt. After the melt has been clarified for the purposes of homogenization, it may be cast into moldings. To this end, the process must be guaranteed complete freedom from alkalis and alkaline earths. The formation of cristobalite is more or less completely pronounced, depending upon the cooling conditions and the temperature treatment.

The alkali-free $SiO_2$-fibers may be produced by any of the known methods.

The processes described in U.S. Pat. No. 3,821,070 or British Pat. No. 1,359,576 are preferably applied in cases where it is desired to obtain fibers with particularly good strength properties. The fibers do not show any porosity. In these processes, a solution of a hydrolyzed tetra-alkoxy silane or alkoxy polysiloxane, optionally in admixture with orgnoalkoxy silanes and/or organoalkoxy polysiloxanes is spun into fibers in the presence of a high molecular weight fiber-forming substance and optionally in the presence of solution promoters, and the fibers thus produced are subsequently subjected to a temperature treatment in order to dry them and to remove the organic constituents.

In cases where fibers with lower strength values are required, as for example in the insulating sector, it is also possible, instead of using a hydrolyzed silicic acid ester optionally in admixture with a hydrolyzed organo alkoxy silane or polysiloxane to use a silica sol providing it does not contain any alkali metal or alkaline earth metal as stabilizer. Alkali-stabilized silica sol may be used providing it is freed from cations beforehand by means of the H-form of a cation exchanger.

These solutions are made spinnable by the addition of a high molecular weight fiber-forming substance for example, high polymers of alkylene oxides containing from 1 to 4 carbon atoms, polyvinyl alcohol, polyvinyl acetate, polyvinyl pyrrolidone, polyvinyl butyral, polymethacrylate, cellulose derivatives such as ethers and/or esters, e.g. methylcellulose, carboxymethylcellulose, water-soluble cellulose acetate and the like, or polyacrylamide. It is preferred to use polyethylene oxide with a degree of polymerization above about 5000 in concentrations of about 0.2 to 5%.

Chromium may be added to the spinning solution in any soluble form, but not in the form of alkali metal or alkaline earth metal chromates. The solution used should not impair the stability of the $SiO_2$-containing spinning solution, at least not during the normal processing time. For example, it is possible to use a chromium oxide sol which has been produced by reducing a $CrO_3$-solution with $H_2O_2$. Chromium sulfate and chromium chloride are less suitable. By contrast, carboxylates, for example formates, acetates, oxalates, tartrates or citrates, are suitable both in the form of neutral and in the form of basic chromium salt solutions. However, mixtures of oxalate with tartrate or citrate have proved to be particularly suitable. Mixtures of this kind may be produced for example by precipitating chromium hydroxide from chromium (III) salt solutions, followed after washing by dissolution in an aqueous solution of oxalic acid, a deficit of oxalic acid preferably being used, based on the molar ratio of Cr to $H_2C_2O_4$ of 1:1.5 required for the neutral chromium oxalate.

Molar ratios of Cr to $H_2C_2O_4$ of about 1:0.5 to 1:1.2 are suitable. To this end, it has proved to be effective to add about 0.1 mole to 2 moles of citric acid or tartaric acid per mol of chromium. An addition of about 0.5 to 1 mole of citric acid per mole of chromium is particularly preferred. The addition may be made either to the chromium oxalate solution or even to the $SiO_2$-sol. However, an excess of oxalic acid may also be used.

A chromium salt solution which may be used with excellent results may also be prepared as follows: 9 g of a 50% hydrazine solution are introduced into a hot solution of 40 g of oxalic acid in 100 ml of water, followed by the dropwise addition over a period of 15 minutes with stirring of a solution of 20 g of $CrO_3$ in 100 ml of water. The temperature rises to 70° C with evolution of gas. The solution is then concentrated in vacuo to 66 g and, finally, is diluted with 35 g of methanol. The clear blue solution contains 15% of chromium, expressed as $Cr_2O_3$.

Both wet and dry spinning processes may be used for spinning. In the wet spinning process, the spinning solutions are spun into a suitable precipitation bath in which the filament gels. Dry spinning may be carried out in a centrifugal spinning machine for the production of staple fibers. Staple fibers may also be produced by the blast-drawing process, in which the fibers issuing from nozzles are stretched by a powerful gas stream flowing in the same direction. The fibers are preferably produced by the conventional dry spinning processes. In this case, the spinning solutions are spun at room temperature or at slightly elevated temperature from a spinning head provided with a plurality of nozzles. The filaments pass through a heated spinning duct through which air or nitrogen flows in the same direction as the filaments. At the end of the spinning duct, the fibers are wound onto a drum. By varying the take-off rate, and also by varying the concentration and viscosity of the spinning solution, it is possible to obtain fibers with diameters in the range of about 1 to 50 $\mu$. The fibres are round or elliptical to kidney-shaped in cross-section.

The subsequent temperature treatment of the fibers is applied both to dry the fibers and to remove volatile constituents. It may be carried out either in air or in an inert gas. During heating, the fibers undergo a weight loss and linear shrinkage. The weight loss is substantially over between about 400° and 500° C, while shrinkage is substantially complete at 700° to 800° C. Thereafter the fibers are still X-ray amorphous. Heating the fibers produced in accordance with the invention for 1 hour at 1100° to 1200° C gives cristobalite fibers with a controlled particle size between 100 and 300 Å and good mechanical strength which is no different from that of the X-ray amorphous form. Heating for 24 hours at 1300° C gives cristobalite fibers having a particle size of from 200 to 300 Å without, however, producing any change in the mechanical properties. Hitherto known cristobalite fibers always had extremely poor mechanical properties attributable to the devitrification of alkali-containing $SiO_2$-fibers or of alkali-free $SiO_2$-fibers sintered to the point of complete uselessness. Cristobalite crystallites with a size of 500 Å and more were formed in both cases.

The process according to the invention is illustrated by the following Examples in which Examples 1, 9, 11 and 12 are Comparison Examples.

EXAMPLE 1

Production of pure $SiO_2$-fibers 104 g of silicic acid tetraethyl ester were heated with stirring to 50° C with 24 g of water and 15 g of methanol, which contained 7.5 mg of hydrogen chloride to accelerate the hydrolysis reaction, the exothermic hydrolysis reaction taking place with an increase in temperature to 70° C. After 10 minutes, 35 g of a 3% methanolic solution of polyethylene oxide with a degree of polymerization of about 100,000 (polyethylene oxide marketed by Union Carbide Corp. under the name Polyox WSR 301) were added with stirring to the hydrolysis solution at a temperature of about 50° C, followed by stirring for 20 minutes at room temperature. The excellently spinnable solution contained 16.9% of $SiO_2$ and 0.59% of polyethylene oxide.

The solution was spun at room temperature through a 0.3 mm nozzle into a duct which had been heated to 120° C and through which air was passed in the same direction as the filaments. At the end of the duct, the fibers were wound onto a drum at a speed of 125 meters per minute.

The fibers were then heated in air to 300° C at a heating rate of 400° C/hour, from 300° C to 500° C at a heating rate of 100° C/hour and from 500° C to 1000° C at a heating rate of 500° C/hour, and subsequently removed from the furnace. The completely clear, colorless fibers had a diameter of 12 $\mu$ and a tensile strength of 100 kp/mm². X-ray examination showed that the fibers were amorphous.

EXAMPLES 2 to 8

Production of chromium-containing $SiO_2$-fibers

A chromium (III) salt solution, which is highly compatible with the $SiO_2$-spinning solution prepared as described above, was obtained as follows: 150 g of $CrCl_3 \cdot 6 H_2O$ were dissolved in 1.5 liters of water, followed by the addition with stirring at 80° C of concentrated ammonia solution up to pH 7.3. The precipitate was filtered off and washed until substantially free from chloride. The filter cake was stirred for 1 hour at 80° to 90° C in a solution of 90 g of oxalic acid in 300 ml of water, as a result of which it was almost completely dissolved.

After filtration, the clear violet filtrate was concentrated in vacuo at 75° C to 183 g using a Rotavapor. After dilution with 50 g of methanol, the resulting solution, which had an analytically determined chromium content of 15.0 %, expressed as $Cr_2O_3$, was used for the production of chromium-containing $SiO_2$-fibers.

The spinning solutions were prepared in the same way as described in Example 1, except that before addition of the methanolic polyethylene oxide solution the chromium oxalate solution was added, corresponding to the required chromium content, and in addition a small quantity of citric acid dissolved.

Spinning and calcination up to 1000° C were carried out in the same way as in Example 1. The strength of the resulting fibers was as high as that of the chromium-free $SiO_2$-fibers. The fibers were X-ray amorphous. They were more or less green in color, corresponding to their chromium content.

Table 1 shows the compositions used for producing the chromium-containing $SiO_2$-fibers.

In order to assess their thermal stability, the fibers of Examples 1 to 8 were heated in air for 24 hours at 1300° C. Whereas the chromium-free fibers of Example 1 had undergone 45% linear shrinkage and were sintered solid, the chromium-containing $SiO_2$-fibers of Examples 2 to 8 showed minimal shrinkage (less than 5%) and had remained completely discrete, flexible and loose. The strength of the chromium-free fibers could no longer be measured, whereas the strength of the chromium-containing fibers had remained substantially unchanged. Although an aluminum silicate fiber sample ("Fiberfrax", a product of Carborundum), which had also been tempered for 24 hours at 1300° C for comparison, did not undergo significant shrinkage, it was sintered solid and, hence, also suffered loss of strength.

Examination of the fibers of Examples 1 to 8 by X-ray photography after tempering at 1300° C showed that, in every case, devitrification had occurred with formation of cristobalite.

Table 1

| Example | Additions to 143 g of silicic acid ester hydrolyzate | | | Composition of the spinning solution | | | | $Cr_2O_3$ in $SiO_2$-fiber (%) |
|---|---|---|---|---|---|---|---|---|
| | chromium oxalate solution(g) | citric acid (g) | polyethylene oxide solution (g) | $SiO_2$ (%) | $Cr_2O_3$ (%) | citric acid (%) | polyethylene oxide (%) | |
| 2 | 0.2 | 0.06 | 35 | 16.9 | 0.02 | 0.03 | 0.59 | 0.1 |
| 3 | 0.5 | 0.15 | 35 | 16.8 | 0.04 | 0.08 | 0.59 | 0.25 |
| 4 | 1.0 | 0.30 | 35 | 16.8 | 0.08 | 0.16 | 0.59 | 0.5 |
| 5 | 2.0 | 0.60 | 35 | 16.6 | 0.17 | 0.33 | 0.58 | 1.0 |
| 6 | 6.0 | 1.80 | 35 | 16.1 | 0.48 | 0.97 | 0.56 | 3.0 |
| 7 | 11.5 | 3.0 | 35 | 15.8 | 0.79 | 1.58 | 0.56 | 5.0 |
| 8 | 20.0 | 6.0 | 40 | 14.3 | 1.43 | 2.90 | 0.57 | 10.0 |

The average crystallite size was determined X-ray photographically by measuring the integral half-value width with a counter tube goniometer according to Scherrer and Bragg.

These values are set out in Table 2.

Table 2

| Example | $Cr_2O_3$ (%) | Average X-ray photographic crystallite size Å |
|---|---|---|
| 1 | 0 | 620 |
| 2 | 0.1 | 295 |
| 3 | 0.25 | 255 |
| 4 | 0.5 | 225 |
| 5 | 1.0 | 230 |
| 6 | 3.0 | 235 |
| 7 | 5.0 | 260 |
| 8 | 10.0 | 220 |

The effectiveness of the $Cr_2O_3$ content upon the crystallization of the fibers may be illustrated further as follows:

The chromium-free $SiO_2$ fibers (Example 1) and the $SiO_2$ fibers containing 0.25% of $Cr_2O_3$ (Example 3) were heated for one hour at 1100° C and for one hour at 1200° C and subsequently examined by X-ray photography. Whereas the chromium-free $SiO_2$-fibers had remained X-ray amorphous in both cases, the fibers that had been heated to 1200° C having been sintered solid, even the small addition of chromium in the fiber of Example 3, both a 1100° C and at 1200° C, was sufficient to produce cristobalite with a particle size of 220 Å (at 1100° C) and 250 Å (at 1200° C) without any evidence of sintering or mechanical damage. In addition, the fibers of Examples 2, 3, 4, 6, 7 and 8 were subjected to heating for 1 hour at 1500° C which they also withstood without damage. Heating for another hour at 1500° C did not produce any change either. X-ray examination of the calcined fibers showed that cristobalite was present in each case. The average crystallite sizes are shown in Table 3.

Table 3

| Example | $Cr_2O_3$ (%) | Average X-ray photographic crystallite size (Å) |
|---|---|---|
| 2 | 0.1 | 555 |
| 3 | 0.25 | 555 |
| 4 | 0.5 | 540 |
| 6 | 3.0 | 530 |
| 7 | 5.0 | 505 |
| 8 | 10.0 | 490 |

After the second heating at 1500° C, the crystallite size of the fibers of Example 4 was unchanged at 540 Å, while the crystallite size of the fibers of Example 6 was measured at 555 Å.

EXAMPLE 9

Production of chromium-free $SiO_2$-fibers from ion-exchanged silica sol

Commercial 30% alkali-stabilized silica sol was freed from alkali metal ions by treatment with an acid ion exchange resin. 100 g of this alkali-free sol were adjusted to pH 10 with $NH_3$-gas, followed by the addition of 32 g of a 3% aqueous polyethylene oxide solution with a degree of polymerization of about 100,000. Stirring for 30 minutes produced a homogeneous, readily spinnable solution containing 22.7% of $SiO_2$ and 0.73% of polyethylene oxide.

The solution was spun in the same way as described in Example 1, except that a 0.7 mm nozzle was used. The spinning-duct temperature was 155° C and the take-off rate 100 m/minute. The temperature treatment was carried out in the same way as in Example 1. The resulting fibers are loose and flexible, but show distinctly lower strength than the fibers of Example 1. X-ray examination of the fibers tempered at up to 1000° C shows an amorphous structure.

EXAMPLE 10

Production of chromium-containing $SiO_2$-fibers from ion-exchanged silica sol 100 g of ion-exchanged silica sol, prepared as in Example 9, were mixed with 10 g of the chromium oxalate solution described in Example 2. The solution was adjusted to pH 8.85 with $NH_3$-gas, after which 31 g of the polyethylene oxide solution of Example 9 were stirred in over a period of 30 minutes. The readily spinnable solution contained 21.3% of $SiO_2$, 1.06% of $Cr_2O_3$ and 0.64% of polyethylene oxide.

Spinning and temperature treatment was carried out in the same way as in Example 9. The fibers, which contained 4.7% of $Cr_2O_3$, were green in color, loose and flexible and similar in strength to those of Example 9. After heating at 1000° C, they were also X-ray amorphous.

The thermal stability of the fibers of Examples 9 and 10 was assessed after they had been heated in air for 24 hours at 1300° C. Whereas the chromium-free fibers of Example 9 had shrunk to a considerable extent and were sintered solid, it was not possible to detect any change in the chromium-containing fibers of Example 10. X-ray examination showed that cristobalite was present in both cases. In the case of the fibers of Example 9, the crystallite size was measured at 605 Å, and, in the case of the fibers of Example 10, at 300 Å. Even after heating for 1 hour at 1500° C, the fibers of Example 10 remained unchanged. X-ray examination revealed a particle size of 565 Å.

EXAMPLE 11

$SiO_2$-fibers of alkali-stabilized silica sol 200 ml of a commercial, alkali-stabilized silica sol (30% by weight of $SiO_2$; 0.16% of Na; density 1.19), 200 ml of $H_2O$ and 65 g of a 2.1% aqueous polyethylene oxide solution (degree of polymerization approximately 136,400) were mixed, and $NH_3$-gas introduced into the resulting mixture up to pH 10.1. The spinning solution, which contained 14.35% of $SiO_2$ and 0.27% of polyethylene oxide, was filtered under pressure and spun into a duct heated to 80° C. The fibers were wound onto a rotating drum and, in this way, were reduced to a diameter of 5 μm. The fibers were then predried at 105° C, placed for 10 minutes in a furnace heated to 900° C and then for another 3 minutes in a furnace heated to 1175° C and subsequently cooled. X-ray analysis showed that the fibers consisted of cristobalite crystallites with a particle size of 500 Å. The same result was obtained when the fibers were heated at 1000° C in accordance with the heating program described in Example 1.

When these fibers are heated for 24 hours at 1300° C, they completely lose their strength and flexibility.

EXAMPLE 12

Chromium-containing $SiO_2$ fibers of alkali-stabilized silica sol

The alkali-stabilized silica sol described in Example 11 was mixed with chromium oxalate solutions as described in Example 2, followed by treatment in accordance with Example 11. It was found that these fibers, too, had completely lost their strength and flexibility after heating for 24 hours at 1300° C.

EXAMPLES 13 to 28

Alkali-free $SiO_2$ containing other metal oxides

In order further to illustrate the invention, comparison tests were carried out to investigate the effect obtained by modifying alkali-free $SiO_2$ with a number of other metal oxides. By way of comparison, Example 13 shows the properties of pure $SiO_2$, while Examples 14 and 15 compare the outstanding influence of dissolved chromium with that of other dissolved oxides in Comparison Examples 16 to 28. In every case, an $SiO_2$-sol of the following composition was used as starting material: 104 g of silicic acid tetra-ethyl ester, 15 g of methanol, 14.6 mg of HCl, 24 g of $H_2O$.

The metal salt was added in solution in a little methanol to this solution. Thereafter the resulting solution was spread over a glass plate and dried in air. The flakes removed after drying were subjected to a temperature treatment up to 1000° C as in Example 1 in order to remove volatile constituents. Thereafter they were tempered for 1 hour at 1200° C. The results are shown in Table 4. It was found that these oxides do not promote cristobalite formation at relatively low temperature. After tempering for 1 hour at 1200° C, the flakes are either caked solid through loss of viscosity like the $SiO_2$-flakes free from metal oxide, or have lost their elasticity through the uncontrolled formation of α-quartz.

Table 4

| Ex. | Addition of | Mole %, based on $SiO_2$ | X-ray result | Remarks |
|---|---|---|---|---|
| 13 | none | | amorphous | caked solid |
| 14 | Cr-acetate | 0.2 | alpha-cristobalite, 265 Å | |
| 15 | Cr-acetate | 2.0 | alpha-cristobalite, 225 Å | |
| 16 | Co-acetate | 0.2 | amorphous | caked |
| 17 | Co-acetate | 2.0 | alpha-quartz, 1380 Å + alpha-cristobalite, 410 Å | |
| 18 | Cu-acetate | 0.2 | amorphous | caked solid |
| 19 | Cu-acetate | 2.0 | amorphous | caked solid |
| 20 | Zn-acetate | 0.2 | amorphous | caked |
| 21 | Zn-acetate | 2.0 | amorphous + alpha-quartz, 820 Å | |
| 22 | Mg-acetate | 0.2 | alpha-quartz, 1280 Å + alpha-cristobalite, 350 Å | |
| 23 | Mg-acetate | 2.0 | amorphous | caked |
| 24 | Ni-acetate | 0.2 | amorphous | caked |
| 25 | Ni-acetate | 2.0 | amorphous | caked |
| 26 | $NH_4$-molybdate | 0.2 | amorphous | caked |
| 27 | $NH_4$-vanadate | 0.2 | amorphous | caked solid |
| 28 | $NH_4$-tungstate | 0.2 | amorphous | caked solid |

It will be appreciated that the instant specification and examples are set forth by way of illustration and not limitation, and that various modifications and changes may be made without departing from the spirit and scope of the present invention.

What is claimed is:

1. The process for the production of $SiO_2$ fibers consisting essentially of hydrolyzing a silicate ester to form an alkali metal and alkaline earth metal-free $SiO_2$-containing solution or sol, adding a high molecular weight filament-forming material selected from the group consisting of a polymeric $C_1$ to $C_4$ alkylene oxide, polyvinyl alcohol, polyvinyl acetate, polyvinyl pyrrolidone, polyvinyl butyral, polymethacrylate, cellulose derivative and polyacrylamide, incorporating into said solution or sol at least one alkali metal and alkaline earth metal-free compound of chromium or manganese in about 0.05 to 20% by weight expressed as $Cr_2O_3$ and $Mn_2O_3$ based on $SiO_2$, spinning said solution or sol to form filaments, and subjecting said filaments to a thermal treatment to effect crystallization, whereby the resulting filaments are of improved thermal stability.

2. The process according to claim 1, wherein the chromium and manganese are present in the solution or sol in about 0.1 to 10% by weight of the $SiO_2$ expressed as $Cr_2O_3$ and $Mn_2O_3$.

3. The process according to claim 1, wherein the high molecular weight filament-forming material comprises polyethylene oxide with a degree of polymerization above about 5000, and it is present in the solution or sol in about 0.1 to 5% by weight.

4. The process according to claim 1, wherein the chromium and manganese are incorporated into said solution or sol as a carboxylic acid salt.

5. The process according to claim 1, wherein the chromium and manganese are incorporated into said solution or sol as the formate, acetate, oxalate, tartrate or citrate in about 0.1 to 2% by weight of the $SiO_2$ expressed as $Cr_2O_3$ and $Mn_2O_3$.

6. The process according to claim 1, wherein the heating is carried out above 1100° C thereby to form crystalline cristobalite having an average crystallite size of about 100 to 500 Å.

* * * * *